United States Patent
Tan et al.

(10) Patent No.: US 10,311,000 B2
(45) Date of Patent: Jun. 4, 2019

(54) INTEGRATED UNIVERSAL SERIAL BUS (USB) TYPE-C SWITCHING

(71) Applicant: Intel Corporation, Santa Clara, CA (US)

(72) Inventors: Siang Lin Tan, Bayan Lepas (MY); Su Wei Lim, Bayan Lepas (MY); Ming Chew Lee, Bayan Lepas (MY); Ofer Nathan, Kiryat Yam (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,560

(22) Filed: Sep. 29, 2017

(65) Prior Publication Data

US 2019/0102335 A1     Apr. 4, 2019

(51) Int. Cl.
*G06F 13/20*     (2006.01)
*G06F 13/38*     (2006.01)
*G06F 13/40*     (2006.01)
*G06F 13/42*     (2006.01)

(52) U.S. Cl.
CPC .......... *G06F 13/385* (2013.01); *G06F 13/20* (2013.01); *G06F 13/405* (2013.01); *G06F 13/4072* (2013.01); *G06F 13/4221* (2013.01)

(58) Field of Classification Search
CPC ........ G06F 13/20; G06F 13/38; G06F 13/382; G06F 13/385; G06F 13/387; G06F 13/40; G06F 13/4004; G06F 13/4022; G06F 13/4063; G06F 13/4068; G06F 13/4072; G06F 13/405; G06F 13/42; G06F 13/4221
See application file for complete search history.

(56) References Cited

U.S. PATENT DOCUMENTS

| | | | | |
|---|---|---|---|---|
| 5,832,244 A | * | 11/1998 | Jolley | G06F 13/385 710/305 |
| 5,931,933 A | * | 8/1999 | Billheimer | G06F 13/385 710/315 |
| 6,088,755 A | * | 7/2000 | Kobayashi | G06K 19/07 710/300 |
| 6,334,160 B1 | * | 12/2001 | Emmert | G06F 13/385 710/105 |
| 7,254,650 B2 | * | 8/2007 | Lin | G06K 7/0008 710/10 |
| 7,318,112 B2 | * | 1/2008 | Park | H04M 1/72527 370/464 |

(Continued)

OTHER PUBLICATIONS

"Thunderbolt™ Technology". Technology Brief. 2012. Intel Corporation (Year: 2012).*

(Continued)

*Primary Examiner* — Thomas J Cleary
(74) *Attorney, Agent, or Firm* — Green, Howard, & Mughal LLP

(57) ABSTRACT

An apparatus is provided which comprises: an input/output (I/O) port; an adaptor; a physical layer to interface between the I/O port and the adaptor; a first controller associated with a first type of communication; and a second controller associated with a second type of communication, wherein the adaptor is to selectively couple the I/O port, via the physical layer, to one of the first controller or the second controller, based at least in part on a type of device coupled to the I/O port.

18 Claims, 9 Drawing Sheets

(56) References Cited

U.S. PATENT DOCUMENTS

| | | | | |
|---|---|---|---|---|
| 7,401,162 | B2* | 7/2008 | Baker | H04L 69/18 709/250 |
| 9,059,906 | B1* | 6/2015 | McCleland | H04L 43/08 |
| 2003/0229739 | A1* | 12/2003 | Brewer | G06F 13/385 710/105 |
| 2004/0133722 | A1* | 7/2004 | Croyle | G06F 13/387 710/105 |
| 2005/0182881 | A1* | 8/2005 | Chou | G06F 13/385 710/301 |
| 2005/0198601 | A1* | 9/2005 | Kuang | G06F 17/5022 716/108 |
| 2006/0282580 | A1* | 12/2006 | Russell, III | G06F 13/387 710/62 |
| 2010/0122011 | A1* | 5/2010 | Arimilli | G06F 13/385 710/316 |
| 2013/0205053 | A1* | 8/2013 | Harriman | G06F 13/4022 710/105 |
| 2013/0297842 | A1* | 11/2013 | Liu | G06F 13/385 710/105 |
| 2014/0181328 | A1* | 6/2014 | Terlizzi | H01R 13/6683 710/11 |
| 2015/0137861 | A1* | 5/2015 | Cornelius | G01D 5/12 327/141 |
| 2016/0378704 | A1* | 12/2016 | Adamson | G06F 13/364 710/104 |
| 2016/0378971 | A1* | 12/2016 | Dunstan | G06F 21/44 726/17 |
| 2018/0069360 | A1* | 3/2018 | Lee | G06F 13/4282 |
| 2018/0113776 | A1* | 4/2018 | Lee | G06F 1/3215 |

OTHER PUBLICATIONS

Wiley, Craig. "DisplayPort Technical Overview". IEEE International Conference on Consumer Electronics (ICCE). Jan. 10, 2011. (Year: 2011).*

"Architecture Overview for Debug". Version 1.1. White Paper. Aug. 17, 2016. MIPI Alliance Inc. (Year: 2016).*

Cunningham, Andrew. "USB 3.1 and Type-C: The only stuff at CES that everyone is going to use". arsTechnica. Online Jan. 8, 2015. Retrieved from Internet Jun. 15, 2018. <https://arstechnica.com/gadgets/2015/01/usb-3-1-and-type-c-the-only-stuff-at-ces-that-everyone-is-going-to-use>. (Year: 2015).*

* cited by examiner

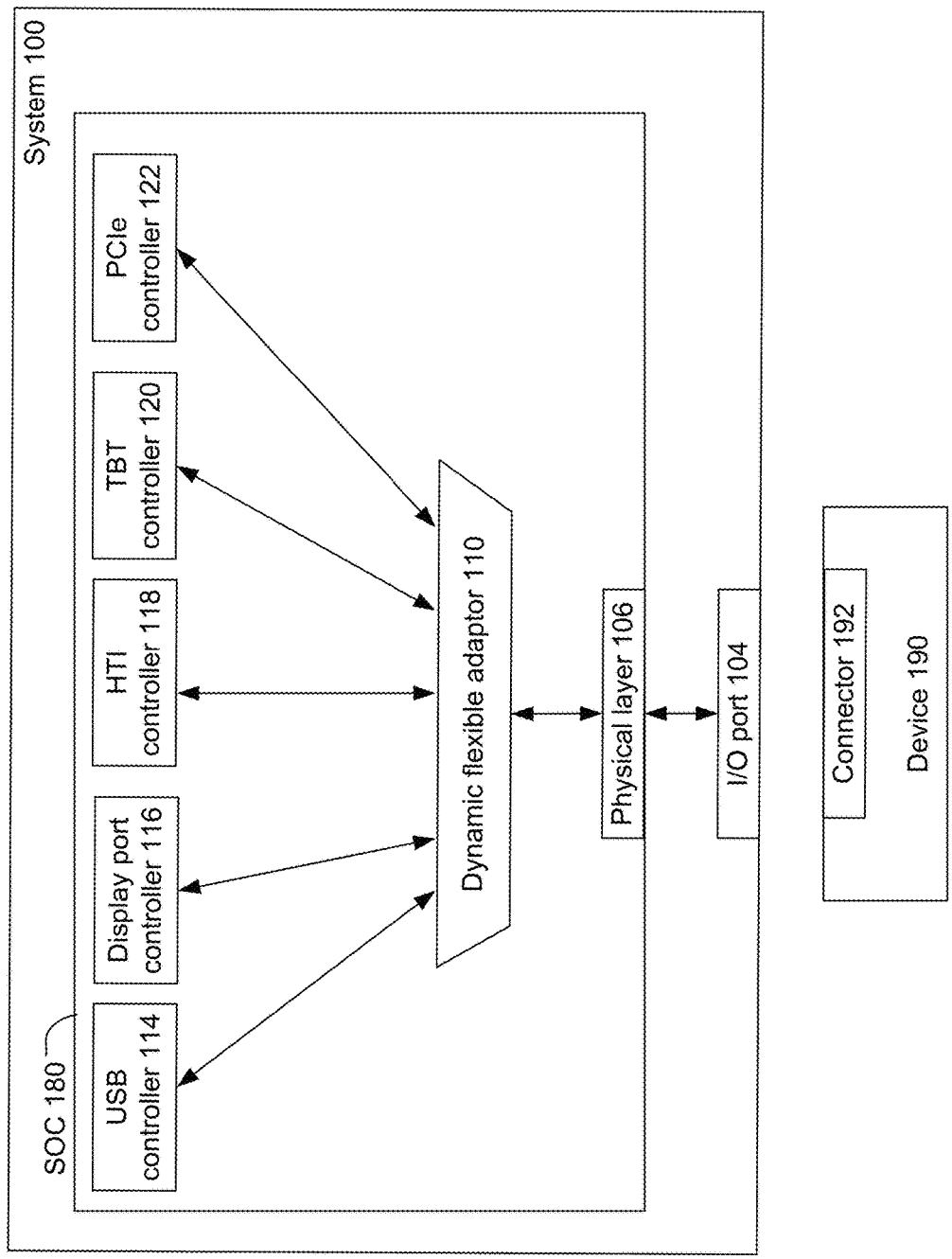

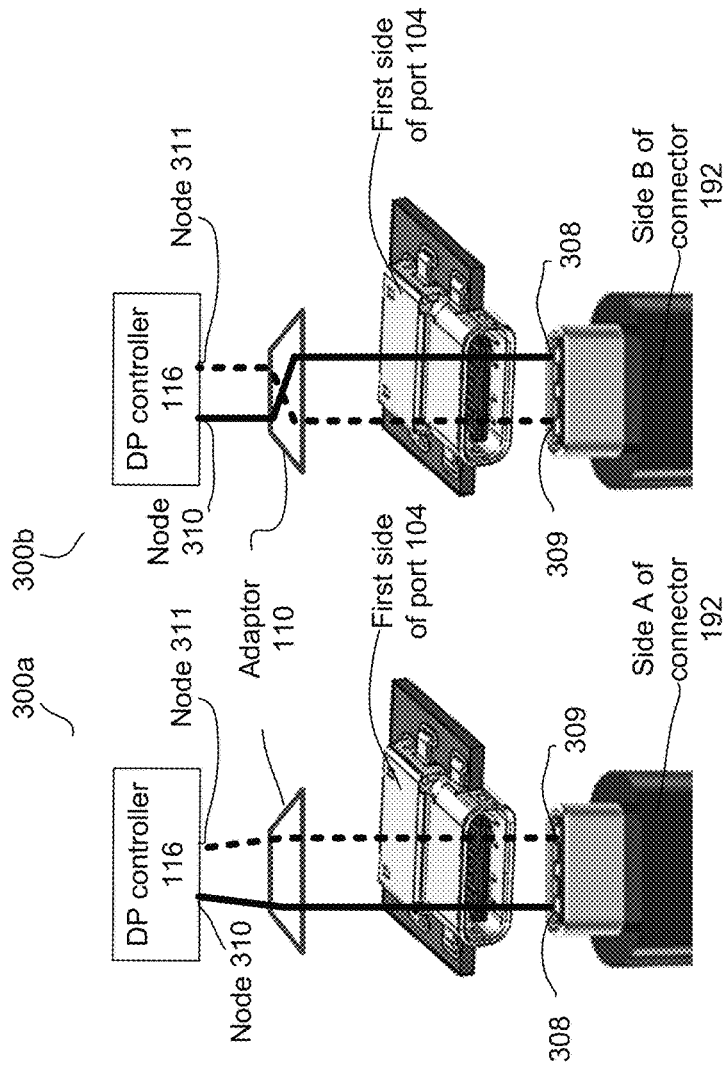

INTEGRATED UNIVERSAL SERIAL BUS (USB) TYPE-C SWITCHING

BACKGROUND

Universal Serial Bus (USB) Type C, also known as USB-C, is a USB connector system that is being used in many modern-day devices. It may be useful to implement protocol multiplexing (also referred to as "muxing") and orientation muxing in USB-C ports, while reducing costs and/or complexity associated with such implementation.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 illustrates a system comprising an Input/Output (I/O) port that may support a plurality of communication types, wherein a common reconfigurable physical layer interfaces with the port, according to some embodiments.

FIG. 2 illustrates an example configuration of the I/O port of FIG. 1, according to some embodiments.

FIG. 3 illustrates a flipability feature of the I/O port of FIG. 1, according to some embodiments.

DETAILED DESCRIPTION

Figure 4:
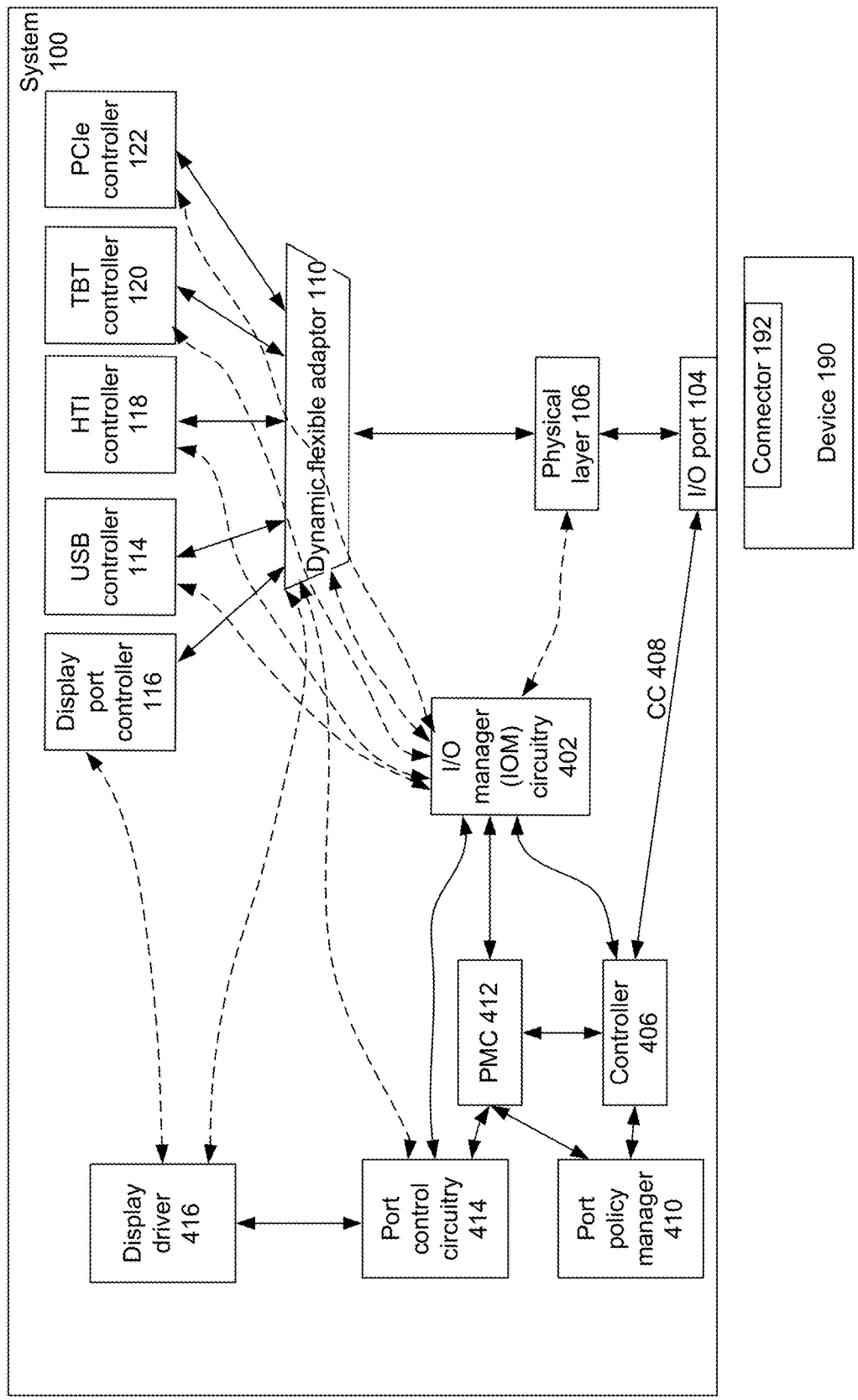
FIG. 4 illustrates the system of FIG. 1 in further details, according to some embodiments.

In some embodiments, an Input/Output (I/O) port, such as a USB-C port, may be able to handle not only with USB communication (e.g., USB 3 and/or USB-C communication), but also one or more other types of communication, e.g., Peripheral Component Interconnect Express (PCIe) communication, Thunderbolt (TBT) communication, Display Port (DP) communication, High-Speed Trace Interface (HTI) communication, and/or the like. In some embodiments, a single and configurable physical layer may be coupled to the port, where the physical layer may be configured according to the type of communication to be handled by the port. Furthermore, an adaptor (e.g., which may act as a multiplexer) may selectively couple the port to one of one or more controllers, e.g., based on the type of communication to be handled by the port. Thus, the USB-C port may use a single physical layer and a single adapter, which may be cost effective and consume less area. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 illustrates a system 100 comprising an Input/Output (I/O) port 104 (also referred to as "port 104") that may support a plurality of communication types, wherein a common configurable physical layer 106 interfaces with the port 104, according to some embodiments. In some embodiments, the plurality of communication types supported by the I/O port 104 may be, for example, two or more of USB communication, PCIe communication, TBT communication, DP communication, HTI communication, and/or the like. Thus, the port 104 may act as one of a USB port, a PCIe port, a TBT port, a display port, or a HTI port. For example, the port 104 may be a USB port (e.g., a USB Type C port, or a USB-C port) that may be compatible with multiple other communication types. Although specific examples of some communication types are discussed herein with respect to the port 104, in some embodiments, the port 104 may support another appropriate type(s) of communication as well.

For example, a device 190 comprises a connector 192, which may be inserted in the port 104. In some embodiments, the connector 192 may be any one of a USB connector, a display device connector, an HTI connector, a TBT connector, and/or a PCIe connector. Thus, the port 104 may be compatible with any of these communication protocols.

In some embodiments, the system 100 may comprise a physical layer 106, which may be a dynamic and reconfigurable physical layer. The physical layer 106 may form an interface or bridge between a dynamic flexible adaptor 110 and the port 104. The physical layer 106 may be dynamic and reconfigurable, because the same physical layer may be used for one of multiple types of communication protocol, which may necessitate dynamic internal reconfiguration of the physical layer.

In some embodiments, the system 100 may comprise a USB controller 114, a display port (DP) controller 116, a HTI controller 118, a TBT controller 120, and/or a PCIe controller 122. Note that the system 100 may have less (or more) controllers than those illustrated in FIG. 1, e.g., based on the communication protocols supported by the system 100 (e.g., based on an implementation of the system 100). For example, the USB controller 114 may manage communication with the device 190, if the connector 192 is a USB connector. For example, the DP controller 116 may manage communication with the device 190, if the device 190 acts as a display device. The HTI controller 118 may manage communication with the device 190, if the connector 192 is a HTI connector. The TBT controller 120 may manage communication with the device 190, if the connector 192 is a TBT connector. The PCIe controller 122 may manage communication with the device 190, if the connector 192 is a PCIe connector.

In some embodiments, a physical layer communicating with a USC device may have different configuration than, for example, a physical layer communicating with a HTI device, or a display device, or a PCIe device, or a TBT device. Thus, the physical layer 106 may be adapted to be compatible with any of the communication protocols supported by the system 100. In some embodiments, the physical layer 106 may be reconfigurable, e.g., based on a type of the connector 192 connected to the port 104, as discussed in further detail herein. Thus, the physical layer 106 may be capable and configurable to support different protocols (e.g., one at a time), e.g., on high speed differential pair buses. In some embodiments, an I/O manager (e.g., illustrated in FIG. 4) and/or the adaptor 110 may determine an owner of the physical layer 106 (e.g., which of the controllers 114, . . . , 122 may own or control the physical layer 106), e.g., based on a mode of the port 104. In some embodiments, the physical layer 106 may also be referred to as a Combo physical layer 106, or as Combo PHY 106 (e.g., as the physical layer 106 is capable of handling multiple communication protocols).

In some embodiments, a dynamic flexible adaptor 110 (also referred to as adaptor 110) may selectively couple one of the controllers 114, . . . , 122 to the physical layer 106, e.g., based on the type of connector 192 coupled to the port 104. For example, an I/O manager (not illustrated in FIG. 1) may configure the adaptor 110 and/or the physical layer 106, e.g., based on the type of the connector 192, as discussed herein in further detail.

In some embodiments, the adaptor 110 may be implemented using a microprocessor, a processing core, or a central processing unit (CPU), and/or the like. In some embodiments, the adaptor 110 may be a Flexible I/O Adaptor (FIA). In some embodiments, the adaptor 110 may also be referred to as a dynamic adaptor or flexible adaptor, e.g., as the adaptor 110 may dynamically and flexibly couple any appropriate type of connector (e.g., USB, HTI, DP, PCIe, TBT, etc.) to the port 104. In some embodiments, the adaptor 110 may act as a multiplexer, or a plurality of multiplexers.

In some embodiments, multiple types of digital interfaces may be supported by the adaptor 110. Merely as examples, some of the digital interfaces supported by the adaptor 110 may comprise a PHY Interface for PCI Express interface (PIPE), a Serializer Deserializer interface (SERDES), a Digital Display Interface (DDI), and/or the like. In an example, PIPE may be used between the USB controller 114 and the physical layer 106. In an example, PIPE may be used between the PCIe controller 122 and the physical layer 106. In an example, SERDES may be used between the TBT controller 120 and the physical layer 106. In an example, DDI may be used between the DP controller 116 and the physical layer 106, and may also be used between the HTI controller 118 and the physical layer 106.

Although PIPE, SERDES, and DDI may be example interfaces that may be supported by the adaptor 110, any other appropriate type of digital interface may also be used. For example, an interface for PCIe type communication may be generally referred to as a PCIe interface (an example of which may be the PIPE interface), an interface for USB type communication may be generally referred to as a USB interface (an example of which may be the PIPE interface), an interface for DP type communication may be referred to generally as a DP interface (an example of which may be the DDI interface), an interface for HTI type communication may be generally referred to as a HTI interface (an example of which may be the DDI interface), and an interface for TBT type communication may be generally referred to as a TBT interface (an example of which may be the SERDES interface), although these interfaces are not illustrated in FIG. 1.

In some embodiments, the controllers 114, . . . , 122, the adaptor 110, and/or the physical layer 106 may be included in a System on a Chip (SOC) 180.

FIG. 2 illustrates an example configuration of the I/O port 104 of FIG. 1, according to some embodiments. For example, FIG. 2 illustrates example locations of the connection points, pins or receptor slots of the I/O port 104. It is to be noted that the example configuration illustrated in this figure is merely an example, and does not limit the scope of this disclosure in any way. In some embodiments and as illustrated in FIG. 2, the connection point configuration may be symmetrical along a vertical axis, a horizontal axis, and/or a diagonal axis. This may result in "flipability" of the port 104 (e.g. a connector may be connected to the port in any of two opposing configurations). For example, due to the symmetrical configuration of the port 104, the connector 192 may be connected to the port 104 in a first orientation and a second orientation, where the first orientation may be 180° different from the second orientation.

FIG. 3 illustrates the flipability feature of the I/O port 104 of FIG. 1, according to some embodiments. For example, FIG. 3 illustrates two scenarios 300a and 300b. In the two scenarios, the port 104 is assumed to have opposing first side and second side, and the connector 192 is assumed to have opposing side A and side B. In the scenario 300a, the connector 192 may be connected to the port 104, such that the first side of the port 104 is aligned with side A of the connector 192. In the scenario 300b, the connector 192 may be connected to the port 104, such that the first side of the port 104 is aligned with side B of the connector 192. Thus, the orientation of the connector 192 is reversed in the two scenarios, and the connector 192 is flipped while connecting in the scenario 300b relative to the scenario 300a. In some embodiments, because of the symmetrical configuration of the port 104 (e.g., as discussed with respect to FIG. 2), such a flipability feature can be implemented.

FIG. 3 also illustrates the adaptor 110 between the port 104 and an example DP controller 116 (although any of the other controllers of FIG. 1 may also replace the DP controller 116 in FIG. 3). The DP controller 116 is assumed to comprise at least two nodes 310 and 311, and the connector 192 is assumed to comprise at least two connection points 308 and 309.

The adapter 110 may facilitate the flipability feature, e.g., by dynamically connecting a connection point of the port 104 to a correct node of a corresponding controller, e.g., based on the orientation in which the connector 192 is connected to the port 104. Thus, the adapter 110 may facilitate implementation of the flipability feature, which may also be referred to as "orientation muxing" feature of the port 104. For example, as illustrated in FIG. 3, the adaptor 110 may be configured such that the connection point 308 of the connector 192 is always coupled to the node 310 of the DP controller 116, and the connection point 309 of the connector 192 is always coupled to the node 311 of the DP controller 116, irrespective of an orientation of the connection of the connector 192 to the port 104 (e.g., irrespective of the connection depicted in scenarios 300a or 300b). Thus, in some embodiments, the adaptor 110 and the configuration of the port 104 (e.g., along with a symmetrical configuration of the connector 192) may allow the above discussed flipability feature of the port 104.

FIG. 4 illustrates the system 100 of FIG. 1 in further details, according to some embodiments. The system 100 in FIG. 4 illustrates various dashed lines and solid lines—the dashed lines are merely drawn in such a manner so as to better distinguish these lines from the solid lines.

In some embodiments, the system 100 may comprise a controller 406. The controller 406 may comprise, for example, an embedded controller associated with the port 104, port chip associated with the port 104, and/or the like. In some embodiments, the controller 406 may receive Configuration Channel (CC) signals 408 from the port 104. The CC signals 408 may, among other things, identify a type and/or configuration information associated with a connector (e.g., connector 192) connected to the port 104. Examples of configuration information included in the CC signal 408 may comprise a type of the connector 192 (e.g., whether the connector is a DP connector, a USB connector, a HTI connector, a TBT connector, a PCIe connector), an orientation in which the connector is connected to the port 104 (e.g., one of the two orientations discussed with respect to FIG. 3), and/or the like.

In some embodiments, the system 100 may also comprise an I/O Manager circuitry 402 (henceforth also referred to as IOM 402). In some embodiments, the IOM 402 may configure the controllers 114, . . . , 122, the adaptor 110, and/or the physical layer 106, e.g., based at least in part on the CC signal 408.

In some embodiments, the system 100 may also comprise a Power Management Controller (PMC) 412. The PMC 412 may, for example, interface between the controller 406 and the TOM 402, and may also determine power management policy associated with the port 104.

In some embodiments, the system 100 may also comprise a port policy manager 410. In some embodiments, the port policy manager 410 may comprise embedded controller firmware, port chip firmware, and/or the like. The port policy manager 410 may formulate operational policy of the port 104. In some embodiments, the system 100 may also comprise a port control circuitry 414 to control aspects of operation of the port 104.

Although various components have been illustrated in FIG. 4, in some embodiments, at least two or more of these components may be combined in a single component. Merely as an example, the controller 406, the PMC 412, and/or the IOM 402 may be combined in a single component. In some embodiments, a component illustrated in FIG. 4 may be implemented as two or more distinct circuitries. For example, the port policy manager 410 may be implemented as an embedded controller firmware and a port chip firmware.

In some embodiments, while some of the components illustrated in FIG. 4 may be implemented in hardware, some of the components may be, in some examples, implemented in software or firmware. Merely as examples, the port policy manager 410 and/or the display driver 416 may be implemented in firmware and/or software, while the PMC 412, the controller 406 and/or the IOM 402 may be implemented in hardware, or a combination of hardware, firmware, and/or software.

In some embodiments, in operation, when a connector (e.g., the connector 192) is connected to the port 104, the CC signal 408 may identify a type of the connector connected to the port 104. For example, if the connector 192 is a USB3 connector, this may be indicated by the CC signal 408. The controller 406 may determine the type of the connector connected to the port 104 (e.g., based on the CC signal 408), based on which the TOM 402 may configure the adaptor 110, one or more of the controllers 114, . . . , 122, and/or the physical layer 106.

For example, if a HTI type connector is connected to the port 104, the IOM 402 may configure the physical layer 106 to appropriately handle HTI communication, and/or the IOM 402 may configure the adaptor 100 to couple the HTI controller 118 to the physical layer 106. For example, a HTI interface in the adaptor 100 may be adapted to handle HTI communication, and hence, the IOM 402 may configure the adaptor 100 to activate the HTI interface to handle the HTI connector (and may gracefully park the other interfaces). In an example, the TOM 402 may configure the HTI controller 118 to communicate with the port 104 via the adaptor 110 and the physical layer 106.

In some embodiments, based on the type of the connector connected to the port 104, the TOM 402 may inform the respective one of the controllers 114, . . . , 122 to start communication. In an example, for the DP controller 116, the TOM 402 may communicate with this controller 116 directly, or may communicate via the port control circuitry 414 and/or the display driver 416.

Figure 5A:
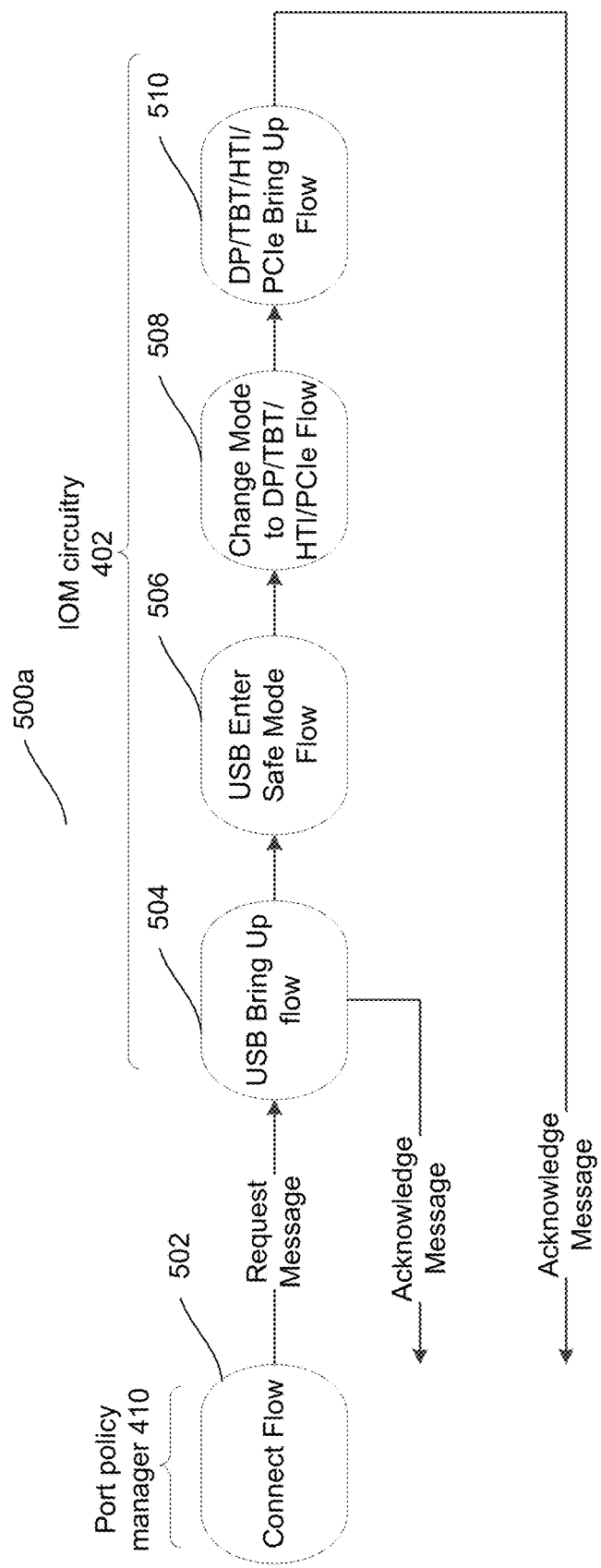
FIG. 5A illustrates a switching flow for connecting a connector to the I/O port of the system of FIGS. 1 and 4, according to some embodiments.

FIG. 5A illustrates a switching flow 500a for connecting a connector to the port 104 of the system 100 of FIGS. 1 and 4, according to some embodiments. The switching flow 500a may be referred to as "connect flow," and may be associated with a mechanical or physical connection of a connector (e.g., connector 192) to the port 104, e.g., a hot plug event. Operations respectively performed by the port policy manager 410 and the IOM circuitry 402 are separately indicated in the FIG. 5A.

At 502, in response to the CC signal 408 indicating a connection in the port 104, the port policy manager 410 may initiate the connect flow at 502. In some embodiments, the port policy manager 410 may transmit a request message to the IOM 402 to commence the connect flow. At 504, the TOM 402 may bring up the USB flow (e.g., by appropriately configuring the USB interface of the adaptor 110, the physical layer 106, and/or the USB controller 114), and send an acknowledgement to the port policy manager 410. If the connector 192 is a USB connector, the flow 500a may end at 504. At 504, a mode (e.g., a state of operation) of the port 104 may be a USB mode.

However, if the connector 192 is not a USB connector, the flow 500a may continue at 506, where the TOM 402 may cause the USB associated components to enter a safe mode flow (e.g., may gracefully park the USB interface of the adaptor 110 at a safe state, may cause the USB controller to enter a low power state, etc.).

At 508, the IOM 402 may change the mode of the port 104 to one of a DP mode, a TBT mode, a HTI mode, or a PCIe mode, e.g., based on a type of the connector 192 connected to the port 104. For example, if the connector 192 is a PCIe connector, the mode at 508 may be the PCIe mode.

At 510, the IOM 402 may bring up one of the PCIe flow, the HTI flow, the DP flow, or the TBT flow, e.g., corresponding to the mode set at 508. In some embodiments, the IOM 402 may bring up the appropriate mode by appropriately configuring the appropriate interface within the adaptor 110, by configuring the physical layer 106, and/or by configuring the appropriate one of the controllers 116, . . . , 122, and send an acknowledgement to the port policy manager 410.

Thus, in FIG. 5A, even if, for example, non-USB connector (e.g., a DP connector or a PCIe connector) is coupled to the port 104, the USB mode may be activated initially, e.g., as the USB mode may be a default mode of the port 104. Subsequently, the port 104 may transition to another appropriate mode.

Figure 5B:
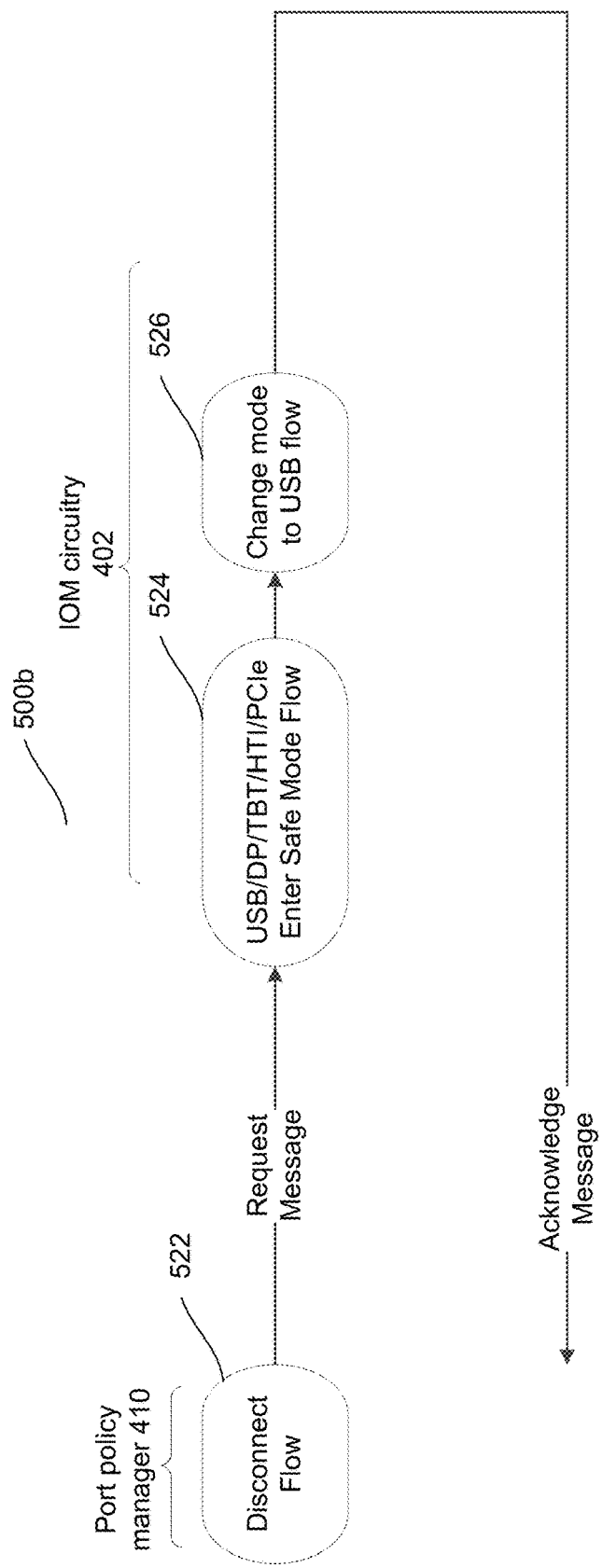
FIG. 5B illustrates a switching flow for disconnecting a connector from the I/O port of the system of FIGS. 1 and 4, according to some embodiments.

FIG. 5B illustrates a switching flow 500b for disconnecting a connector from the port 104 of the system 100 of FIGS. 1 and 4, according to some embodiments. The switching flow 500b may be referred to as "disconnect flow," and may be associated with a mechanical or physical disconnection of a connector (e.g., connector 192) from the port 104, e.g., a hot unplug event.

At 522, in response to the CC signal 408 indicating a mechanical or physical disconnection in the port 104, the port policy manager 410 may initiate the disconnect flow at 522, e.g., by transmitting a request message to the IOM 402. At 524, the TOM 402 may cause the currently active components (e.g., one of USB, HTI, DP, PCIe, or TBT components, based on the type of connector connected to the port 102 prior to the disconnect event) to enter a safe mode (e.g., a low power state). For example, the USB interface, the PCIe interface, the DP interface, the TBT interface, or the HTI interface of the adaptor 110 (which was active prior to the disconnection) and the corresponding one of the controllers 114, . . . , 122 may be caused to enter a sleep or low power state.

At 526, the IOM 402 may cause the mode of the port 104 to be the USB flow, e.g., as the USB flow may be a default mode of the port 104. It may be noted that although the IOM 402 may cause the mode of the port 104 to be changed to the USB flow, the IOM 402 may not bring up the components used for USB flow (e.g., may not activate or power up the USB interface in the adaptor 110, the USB controller 114, etc.). Subsequently, the IOM 402 may transmit an acknowledge message to the port policy manager 410.

Figure 5C:
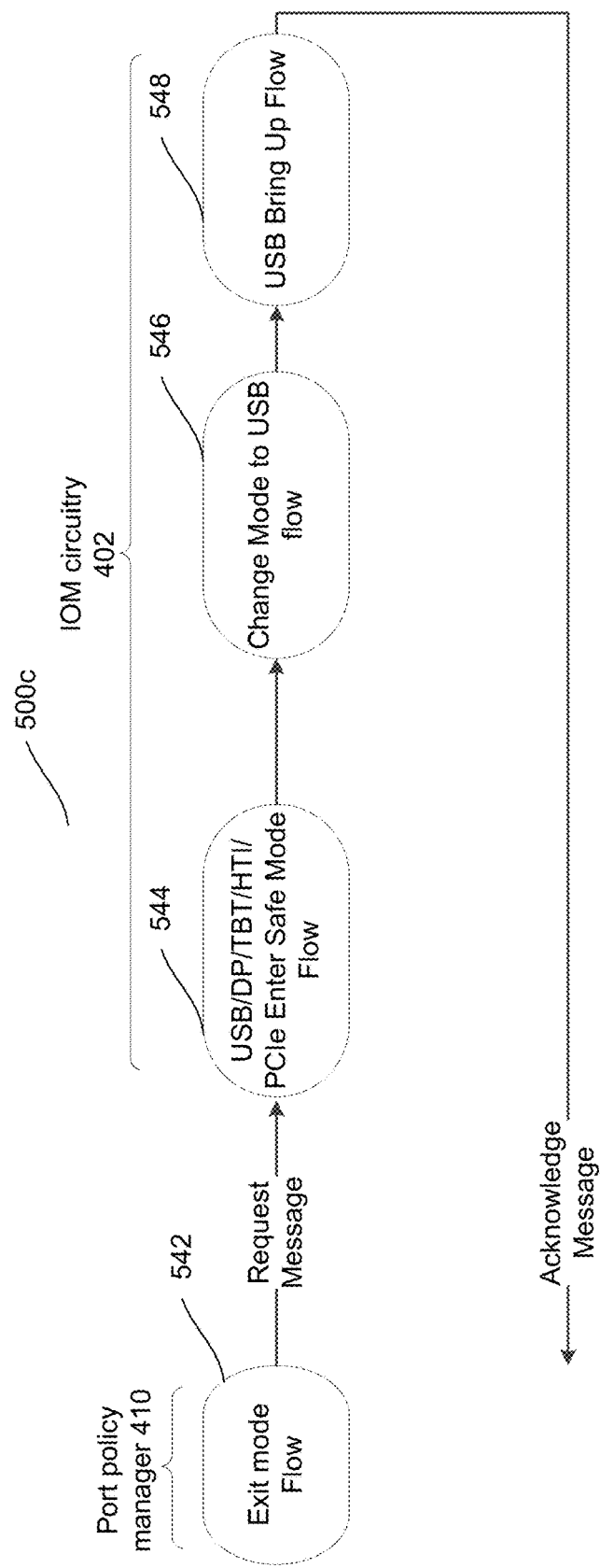
FIG. 5C illustrates a switching flow for an exit mode flow in the I/O port of the system of FIGS. 1 and 4, according to some embodiments.

FIG. 5C illustrates a switching flow 500b for an exit mode flow in the port 104 of the system 100 of FIGS. 1 and 4, according to some embodiments. The switching flow 500c may be associated with a scenario when the port 104 is to exit from the current mode, without physical or mechanical disconnection of a connector (e.g., connector 192) from the port 104. Such flow may be triggered by the device 190 (or the system 100), e.g., when the device 190 intends to change a type of connection to be used for the connector 192.

At 542, in response to a request for an exit mode flow, the port policy manager 410 may initiate the exit mode connect flow at 542. In some embodiments, the port policy manager 410 may transmit a request message to the IOM 402. At 544, the IOM 402 may cause the current active components (e.g., one of USB, HTI, DP, PCIe, or TBT components, based on the type of connector connected to the port 102 prior to the exit mode flow event) to enter a safe mode (e.g., a low power state). For example, the USB interface, the PCIe interface, the DP interface, the TBT interface, or the HTI interface of the adaptor 110 (which was active prior to the exit mode flow) and the corresponding one of the controllers 114, . . . , 122 may be caused to enter a sleep or low power state.

At 546, the IOM 402 may cause the mode of the port 104 to be the USB flow, e.g., as the USB flow may be a default mode of the port 104, and at 548 the IOM may bring up the USB flow. Bringing up a flow, e.g., a USB flow, has been discussed with respect to 504, and hence, is not discussed further herein.

If the exit mode flow is associated with exiting a current first mode and entering a second mode (e.g., where the second mode is not USB), in some embodiments, at 546 and 548, the mode may be changed to the second mode (e.g., instead of USB mode) and the flow corresponding to the second mode (e.g., instead of USB mode) may be brought up, respectively, although these alternative steps are not illustrated in FIG. 5C.

Alternatively, if the exit mode flow is associated with exiting a current first mode and entering a second mode (e.g., where the second mode is not USB), in some other embodiments, subsequent to 548, the USB may be made to enter a safe mode, the mode may be changed to the second mode, and the flow corresponding to the second mode may be brought up, although these additional steps are not illustrated in FIG. 5C.

Figure 5D:
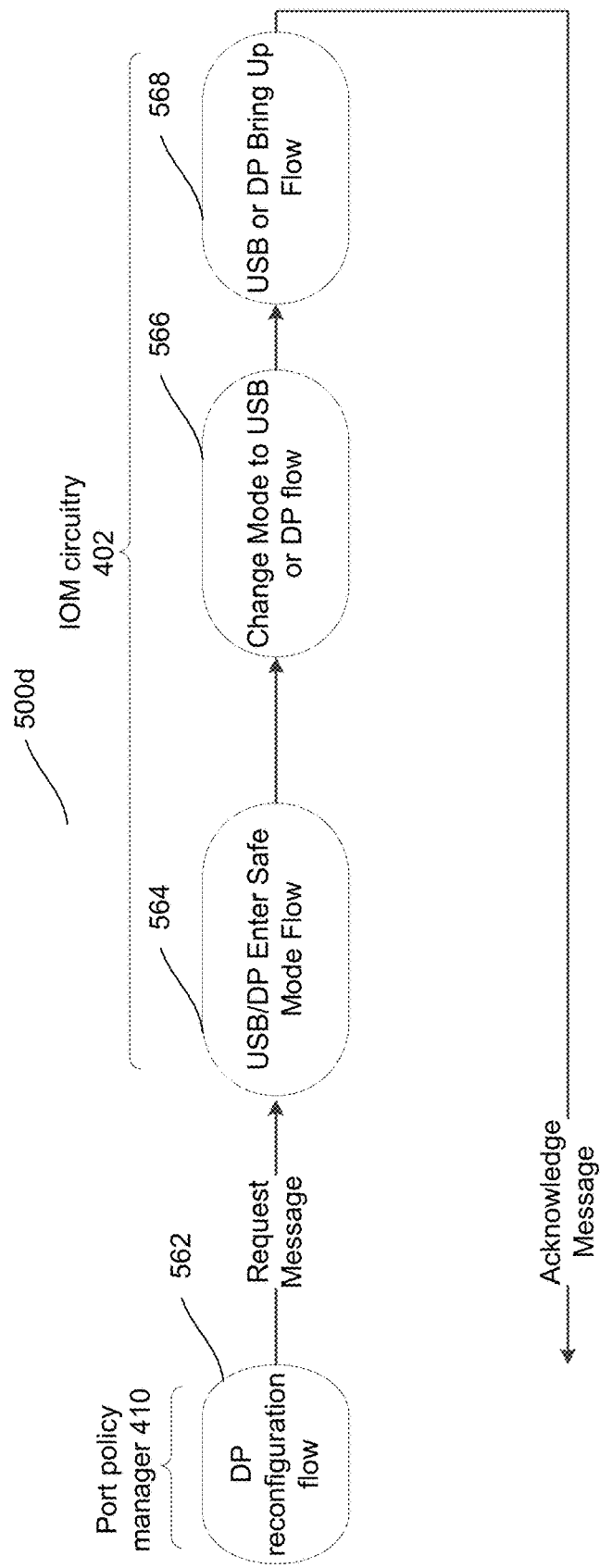
FIG. 5D illustrates a switching flow for a Display Port reconfiguration flow in the I/O port of the system of FIGS. 1 and 4, according to some embodiments.

FIG. 5D illustrates a switching flow 500d for a Display Port reconfiguration flow in the port 104 of the system 100 of FIGS. 1 and 4, according to some embodiments. For example, a display device may present itself to the port 104 as a USB device and/or as a display device. For example, the display device may present itself to the port 104 initially as a USB device, and later as a display device, where the change from being a USB device to being a display device may occur without physical or mechanical disconnection of the connector of the device from the port 104. The opposite may also occur (e.g., presenting initially as a display device, and later as a USB device). In some embodiments, the flow 500*d* may be associated with a scenario when the port 104 is to change its mode from display port mode to USB mode, or from USB mode to display port mode.

At 562, in response to a request for a DP reconfiguration flow, the port policy manager 410 may initiate the flow at 562. In some embodiments, the port policy manager 410 may transmit a request message to the IOM 402. At 564, the TOM 402 may cause the current mode (e.g., one of the USB or DP mode, based on the type of connector presented by the display device prior to the initiation of the flow 500*d*) to enter a safe mode (e.g., a low power state). For example, the USB interface or the DP interface of the adaptor 110 (which was active prior to the flow 500*d*) and the corresponding one of the controllers 114 or 116 may be caused to enter a sleep or low power state.

At 566, the IOM 402 may cause the mode of the port 104 to be the USB flow or DP flow, e.g., based on the target mode of the display device. At 568, the TOM 402 may bring up the USB flow or the DP flow. Bringing up a flow, e.g., a USB flow, has been discussed with respect to 504, and hence, is not discussed further herein.

Figure 5E:
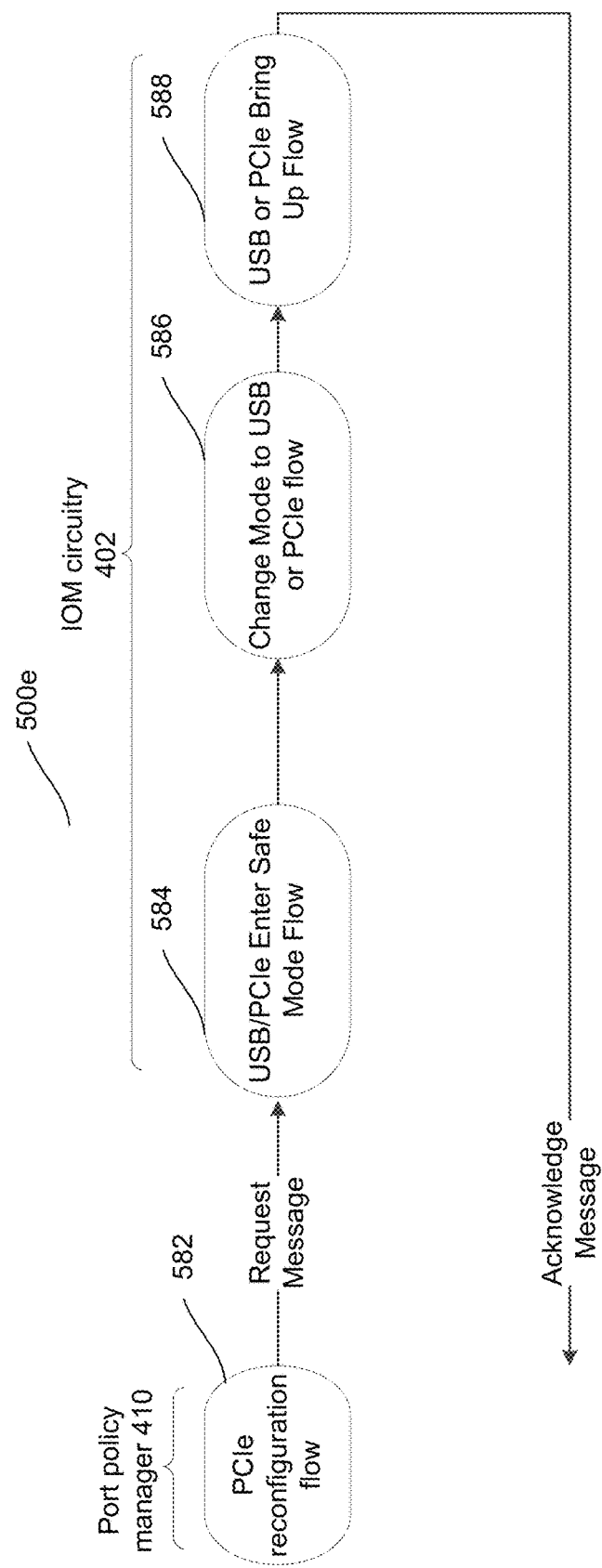
FIG. 5E illustrates a switching flow for a Peripheral Component Interconnect Express (PCIe) communication reconfiguration flow in the I/O port of the system of FIGS. 1 and 4, according to some embodiments.

FIG. 5E illustrates a switching flow 500*e* for a PCIe reconfiguration flow in the port 104 of the system 100 of FIGS. 1 and 4, according to some embodiments. For example, a display device may present itself to the port 104 as a USB device and/or as a PCIe device. For example, the device may present itself to the port 104 initially as a USB device, and later as a PCIe device, where the change from being a USB device to being a PCIe device may occur without physical or mechanical disconnection of the connector of the device from the port 104. The opposite may also occur (e.g., presenting initially as a PCIe device, and later as a USB device). In some embodiments, the flow 500*e* may be associated with a scenario when the port 104 is to change its mode from PCIe mode to USB mode, or from USB mode to PCIe mode.

At 582, in response to a request for a PCIe reconfiguration flow, the port policy manager 410 may initiate the flow. In some embodiments, the port policy manager 410 may transmit a request message to the IOM 402. At 584, the TOM 402 may cause the current mode (e.g., one of the USB or PCIe mode, based on the type of connector presented by the device prior to the initiation of the flow 500*d*) to enter a safe mode (e.g., a low power state). For example, the USB interface or the PCIe interface of the adaptor 110 (which was active prior to the flow 500*d*) and the corresponding one of the controllers 114 or 122 may be caused to enter a sleep or low power state.

At 586, the IOM 402 may cause the mode of the port 104 to be the USB flow or PCIe flow, e.g., based on the target mode of the PCIe device. At 568, the IOM 402 may bring up the USB flow or the PCIe flow. Bringing up a flow, e.g., a USB flow, has been discussed with respect to 504, and hence, is not discussed further herein.

Thus, referring to FIGS. 5C and 5D, when the port 104 is to switch from one protocol to the other (e.g., from USB3 to DP), the USB controller 114 may experience a disconnect event on the high-speed (HS) interface. Disconnect event is defined in USB3 bus, and hence, the USB controller 114 in the SOC 180 may act accordingly to interrupt a USB Driver to put the USB interface into low power state, and then wait for subsequent connect event.

Similarly, in some embodiments, disconnect event may be defined in DP bus as well, but through the Hot Plug Detect (HPD) message over the CC signal 408 (e.g., instead of through the HS bus). In an example, in the SOC integrated solution using the adaptor 110, disconnect event may not be defined in PIPE, SERDES and/or DDI interfaces. Hence the current owner of physical layer 106 may gracefully park its PIPE, SERDES or DDI interface at the safe state, and subsequently the adaptor 110 may switch the owner to a next owner. Graceful park of a controller may be performed through register programming, which may be part of the switching flows illustrated in FIGS. 5A-5E.

Referring now to FIG. 1-5E, various embodiments of this disclosure may allow orientation muxing (e.g., as discussed with respect to FIG. 2-3) and protocol muxing in USB-C ports, such as the port 104. The combo physical layer 106 may be implemented in the same SOC 180 or the same board as the adaptor 110 and the controllers 114, . . . , 122. Furthermore, in the system 100 discussed herein, a single adaptor 110 and a single physical layer 106 may handle different types of communication. In contrast, in some convention systems, separate physical layers and separate adaptors may be used for separate types of communication (e.g., a first physical layer and a first adaptor may be used for USB communication, a second physical layer and a second adaptor may be used for PCIe communication, etc.). Thus, the system 100 may have reduced Bill of Material (BOM) cost of the SOC 180 and/or may have reduced system power consumption, e.g., over such a conventional system. Furthermore, the system 100 may be adopted to handle large number of communication protocols, such as USB, DP, TBT, HTI, PCIe, etc.

Figure 6:
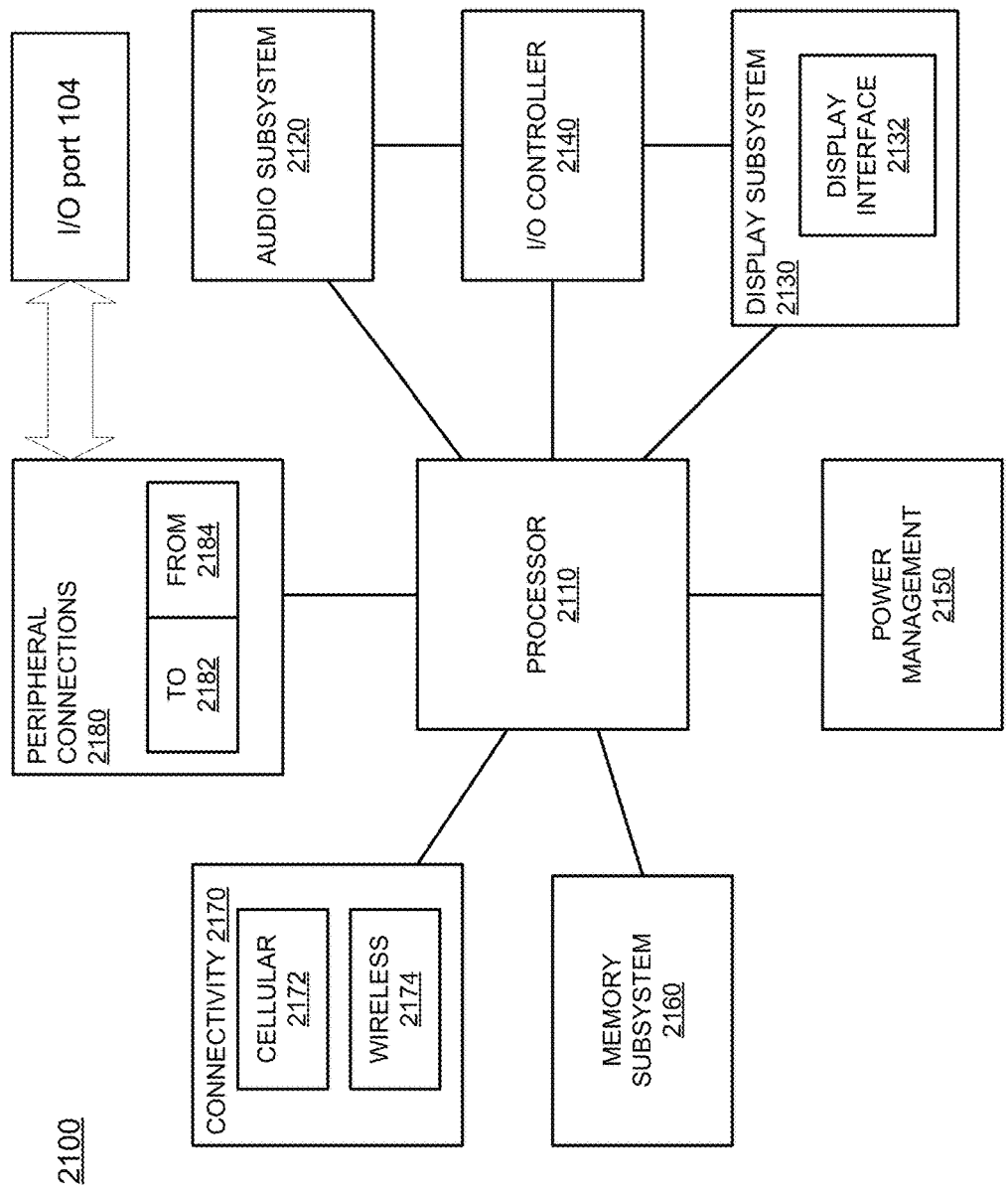
FIG. 6 illustrates a computer system, computing device or a SoC (System-on-Chip), where an I/O port may implement orientation muxing and protocol muxing using a reconfigurable physical layer and a dynamic flexible adaptor, in accordance with some embodiments.

FIG. 6 illustrates a computer system, computing device or a SoC (System-on-Chip) 2100, where an I/O port (e.g., the port 104) may implement orientation muxing and protocol muxing using a reconfigurable physical layer (e.g., physical layer 106) and a dynamic flexible adaptor (e.g., adaptor 110), in accordance with some embodiments. It is pointed out that those elements of FIG. 6 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the peripheral connections 2180 may comprise (or may be coupled to) the port 104, as discussed in FIGS. 1-4. For example, the port 104 may implement orientation muxing and protocol muxing using a reconfigurable physical layer (e.g., physical layer 106) and a dynamic flexible adaptor (e.g., adaptor 110), as discussed in FIGS. 1-4. Merely as an example, the processor 2110, one or more of the controllers 114, . . . , 122, the adaptor 110, and/or the physical layer 106 may be included in an SOC (e.g., the SOC 180 discussed with respect to FIG. 1). In some embodiments, the processor 2110 may communicate with the device 190 of FIG. 1, e.g., via the port 104.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Example 1

An apparatus comprising: an input/output (I/O) port; an adaptor; a physical layer to interface between the I/O port and the adaptor; a first controller associated with a first type of communication; and a second controller associated with a second type of communication, wherein the adaptor is to selectively couple the I/O port, via the physical layer, to one of the first controller or the second controller, based at least in part on a type of device coupled to the I/O port.

Example 2

The apparatus of example 1 or any other example, further comprising: a first circuitry to: configure the physical layer to handle the first type of communication, in response to a first device being coupled to the I/O port, and reconfigure the physical layer to handle the second type of communication, in response to a second device being coupled to the I/O port.

Example 3

The apparatus of example 2 or any other example, wherein the first circuitry is to: cause the adaptor to couple the I/O port to the first controller, in response to the first device being coupled to the I/O port; and cause the adaptor to couple the I/O port to the second controller, in response to the second device being coupled to the I/O port.

Example 4

The apparatus of example 2 or any other example, further comprising: a second circuitry to: receive a Configuration Channel (CC) signal from the I/O port, the CC signal identifying the type of device coupled to the I/O port; and transmit, to the first circuitry, an identification of the type of device coupled to the I/O port.

Example 5

The apparatus of example 1 or any other example, further comprising: a third controller associated with a third type of communication; a fourth controller associated with a fourth type of communication; and a fifth controller associated with a fifth type of communication, wherein the adaptor is to selectively couple the I/O port to one of the first controller, the second controller, the third controller, the fourth controller, or the fifth controller, based at least in part on the type of device coupled to the I/O port.

Example 6

The apparatus of example 5 or any other example, wherein: the first type of communication is Universal Serial Bus (USB) communication; the second type of communication is Peripheral Component Interconnect Express (PCIe) communication; the third type of communication is Thunderbolt (TBT) communication; the fourth type of communication is Display Port (DP) communication; and the fifth type of communication is High-Speed Trace Interface (HTI) communication.

Example 7

The apparatus of example 1 or any other example, wherein: the adaptor is to transition to a first mode corresponding to the first type of communication, in response to a first device being coupled to the I/O port, wherein the first device is configured for the second type of communication, and wherein the first type of communication is Universal Serial Bus (USB) communication; and subsequent to transitioning to the first mode, the adaptor is to transition to the second mode, and the second controller is to activate to start communicating with the first device.

Example 8

The apparatus of example 1 or any other example, wherein: the adaptor is to transition to a first mode corresponding to the first type of communication, in response to a first device being disconnected from the I/O port, wherein the first device is configured for the second type of communication, and wherein the first type of communication is Universal Serial Bus (USB) communication.

Example 9

The apparatus of any of examples 1-8 or any other example, wherein the I/O port is a Universal Serial Bus (USB) type C port.

Example 10

The apparatus of any of examples 1-8 or any other example, further comprising: a System on a Chip (SOC) comprising the first controller, the second controller, the adaptor, and the physical layer.

Example 11

The apparatus of any of examples 1-8 or any other example, wherein: the I/O port comprises a plurality of connection points that are arranged in a symmetrical configuration; the I/O port is to receive a connector in either a first orientation or a second orientation; and the adaptor is to selectively couple a first connection point of the plurality of connection points to either a first node or a second node of the first controller, based at least in part of an orientation in which the I/O port receives the connector.

Example 12

A system comprising; a memory; a processor coupled to the memory; an input/output (I/O) port, wherein the processor is to communicate with one or more external devices via the I/O port, and wherein the I/O port is compatible with two or more communication protocols; and a configurable physical layer coupled to the I/O port, the configurable physical layer being dynamically configured based at least in part on a communication protocol being handled by the I/O port.

Example 13

The system of example 12 or any other example, further comprising: a first controller to control communication using a first communication protocol via the I/O; a second controller to control communication using a second communication protocol via the I/O; and an adapter to dynamically couple the I/O port, via the configurable physical layer, to one of the first controller or the second controller.

Example 14

The system of example 13 or any other example, further comprising: one or more circuitries: to communicate with the I/O port via a Configuration Channel (CC), identify that the I/O port is to communicate with an external device using a first communication protocol, and configure the adapter and the configurable physical layer, based at least in part on identifying that the I/O port is to communicate with the external device using the first communication protocol.

Example 15

The system of any of examples 12-14 or any other example, wherein the two or more communication protocols comprises two or more of: Universal Serial Bus (USB) communication protocol, Peripheral Component Interconnect Express (PCIe) communication protocol, Thunderbolt (TBT) communication protocol, Display Port (DP) communication protocol, and High-Speed Trace Interface (HTI) communication protocol.

Example 16

The system of any of examples 12-14 or any other example, wherein the I/O port is a Universal Serial Bus (USB) type C port.

Example 17

The system of any of examples 12-14 or any other example, further comprising: a System on a Chip (SOC) comprising the processor and the configurable physical layer.

Example 18

Non-transitory computer-readable storage media to store instructions that, when executed by a processor, cause the processor to: detect a type of a connector connected to an Input/Output (I/O) port; configure a physical layer coupled to the I/O port, based at least in part on the type of the connector; and configure an adapter coupled to the physical layer, based at least in part on the type of the connector.

Example 19

The non-transitory computer-readable storage media of example 18 or any other example, wherein the instructions, when executed, further cause the processor to: detect an orientation of the connector connected to the I/O port; and configure the adapter, based at least in part on the orientation of the connector.

Example 20

The non-transitory computer-readable storage media of any of examples 18-19 or any other example, wherein the instructions, when executed, further cause the processor to: activate a first controller to communicate over the I/O port using a first communication protocol, based at least in part of a first type of connector being coupled to the I/O port; and activate a second controller to communicate over the I/O port using a second communication protocol, based at least in part of a second type of connector being coupled to the I/O port.

Example 21

A method comprising: detecting a type of a connector connected to an Input/Output (I/O) port; configuring a physical layer coupled to the I/O port, based at least in part on the type of the connector; and configuring an adapter coupled to the physical layer, based at least in part on the type of the connector.

Example 22

The method of example 21 or any other example, further comprising: detecting an orientation of the connector connected to the I/O port; and configuring the adapter, based at least in part on the orientation of the connector.

Example 23

The method of any of examples 21-22 or any other example, further comprising: activating a first controller to communicate over the I/O port using a first communication protocol, based at least in part of a first type of connector being coupled to the I/O port; and activating a second controller to communicate over the I/O port using a second communication protocol, based at least in part of a second type of connector being coupled to the I/O port.

Example 24

An apparatus comprising: means for performing the method of any of the examples 21-23 or any other example.

Example 25

An apparatus comprising: means for detecting a type of a connector connected to an Input/Output (I/O) port; means for configuring a physical layer coupled to the I/O port, based at least in part on the type of the connector; and means for configuring an adapter coupled to the physical layer, based at least in part on the type of the connector.

Example 26

The apparatus of example 25 or any other example, further comprising: means for detecting an orientation of the connector connected to the I/O port; and means for configuring the adapter, based at least in part on the orientation of the connector.

Example 27

The apparatus of any of examples 25-26 or any other example, further comprising: means for activating a first controller to communicate over the I/O port using a first communication protocol, based at least in part of a first type of connector being coupled to the I/O port; and means for activating a second controller to communicate over the I/O port using a second communication protocol, based at least in part of a second type of connector being coupled to the I/O port.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   an input/output (I/O) port;
   an adaptor;
   a physical layer to interface between the I/O port and the adaptor;
   a first controller associated with a first type of communication; and
   a second controller associated with a second type of communication,
   wherein the adaptor is to selectively couple the I/O port, via the physical layer, to one of the first controller or the second controller, based at least in part on a type of device coupled to the I/O port,
   wherein the adaptor is to transition to a first mode corresponding to the first type of communication, in response to a first device being coupled to the I/O port, wherein the first device is for the second type of communication, and wherein the first type of communication comprises Universal Serial Bus (USB) communication,
   wherein subsequent to transition to the first mode, the adaptor is to transition to a second mode corresponding to the second type of communication, and the second controller is to activate to start to communicate with the first device, and
   wherein the adaptor is to transition to the first mode corresponding to the first type of communication, in response to and subsequent to the first device being disconnected from the I/O port and prior to any other device being connected to the I/O port.

2. The apparatus of claim 1, further comprising:
   a first circuitry to:
   configure the physical layer to handle the second type of communication, in response to the first device being coupled to the I/O port, and
   reconfigure the physical layer to handle the first type of communication, in response to a second device being coupled to the I/O port.

3. The apparatus of claim 2, wherein the first circuitry is to:
   cause the adaptor to couple the I/O port to the second controller, in response to the first device being coupled to the I/O port; and
   cause the adaptor to couple the I/O port to the first controller, in response to the second device being coupled to the I/O port.

4. The apparatus of claim 2, further comprising:
   a second circuitry to:
   receive a Configuration Channel (CC) signal from the I/O port, the CC signal to identify the type of device coupled to the I/O port; and
   transmit, to the first circuitry, an identification of the type of device coupled to the I/O port.

5. The apparatus of claim 1, further comprising:
   a third controller associated with a third type of communication;
   a fourth controller associated with a fourth type of communication; and
   a fifth controller associated with a fifth type of communication,
   wherein the adaptor is to selectively couple the I/O port to one of the first controller, the second controller, the third controller, the fourth controller, or the fifth controller, based at least in part on the type of device coupled to the I/O port.

6. The apparatus of claim 5, wherein:
   the second type of communication comprises Peripheral Component Interconnect Express (PCIe) communication;
   the third type of communication comprises Thunderbolt (TBT) communication;
   the fourth type of communication comprises Display Port (DP) communication; and
   the fifth type of communication comprises High-Speed Trace Interface (HTI) communication.

7. The apparatus of claim 1, wherein the I/O port comprises a Universal Serial Bus (USB) type C port.

8. The apparatus of claim 1, further comprising:
a System on a Chip (SOC) comprising the first controller, the second controller, the adaptor, and the physical layer.

9. The apparatus of claim 1, wherein:
the I/O port comprises a plurality of connection points that are arranged in a symmetrical configuration;
the I/O port is to receive a connector in either a first orientation or a second orientation; and
the adaptor is to selectively couple a first connection point of the plurality of connection points to either a first node or a second node of the first controller, based at least in part of an orientation in which the I/O port receives the connector.

10. A system comprising;
a memory;
a processor coupled to the memory;
an input/output (I/O) port, wherein the processor is to communicate with one or more external devices via the I/O port, and wherein the I/O port is compatible with two or more types of communication protocols;
a first controller associated with a first type of communication protocol, and a second controller associated with a second type of communication protocol; and
an adaptor is to selectively couple the I/O port to one of: the first controller or the second controller, based at least in part on a type of device coupled to the I/O port,
wherein in response to a first device being coupled to the I/O port, the adapter is to operate at a first mode corresponding to the first type of communication protocol,
wherein the first device is for the first type of communication protocol,
wherein the adaptor is to transition to a second mode which corresponds to the second type of communication protocol, in response to and subsequent to the first device being disconnected from the I/O port and prior to any other device being connected to the I/O port, and
wherein the second type of communication protocol comprises Universal Serial Bus (USB) communication protocol.

11. The system of claim 10, further comprising:
a configurable physical layer coupled to the I/O port, the configurable physical layer being dynamically configured based at least in part on a communication protocol being handled by the I/O port.

12. The system of claim 11, further comprising:
one or more circuitries:
to communicate with the I/O port via a Configuration Channel (CC),
to identify that the I/O port is to communicate with the first device via the first type of communication protocol, and
to configure the adapter and the configurable physical layer, based at least in part on an identity of identifying that the I/O port is to communicate with the first device via the first type of communication protocol.

13. The system of claim 10, wherein the two or more types of communication protocols comprises at least one of: USB communication protocol, Peripheral Component Interconnect Express (PCIe) communication protocol, Thunderbolt (TBT) communication protocol, Display Port (DP) communication protocol, or High-Speed Trace Interface (HTI) communication protocol.

14. The system of claim 10, wherein the I/O port is a Universal Serial Bus (USB) type C port.

15. The system of claim 10, further comprising:
a System on a Chip (SOC) comprising the processor and the configurable physical layer.

16. Non-transitory computer-readable storage media to store instructions that, when executed by a processor, cause the processor to:
detect a type of a connector connected to an Input/Output (I/O) port;
configure a physical layer coupled to the I/O port, based at least in part on the type of the connector,
wherein the physical layer is configured using an I/O manager circuitry, based at least in part on a Configuration Channel (CC) signal received from the I/O port;
configure an adapter coupled to the physical layer, based at least in part on the type of the connector;
cause the adaptor to transition to a first mode corresponding to a first type of communication, in response to a first connector being coupled to the I/O port, wherein the first connector is configured for a second type of communication, and wherein the first type of communication is Universal Serial Bus (USB) communication;
subsequent to the adapter transitioning to the first mode, cause the adaptor to transition to a second mode corresponding to the second type of communication, while the first connector continues to be coupled to the I/O port; and
cause the adaptor to transition to the first mode corresponding to the first type of communication, subsequent to the first connector being decoupled from the I/O port and prior to any other connector being coupled to the I/O port.

17. The non-transitory computer-readable storage media of claim 16, wherein the instructions, when executed, further cause the processor to:
detect an orientation of the connector connected to the I/O port; and
configure the adapter, based at least in part on the orientation of the connector.

18. The non-transitory computer-readable storage media of claim 16, wherein the instructions, when executed, further cause the processor to:
activate a first controller to communicate over the I/O port using a first communication protocol, based at least in part of a first type of connector being coupled to the I/O port; and
activate a second controller to communicate over the I/O port using a second communication protocol, based at least in part of a second type of connector being coupled to the I/O port.

* * * * *